April 14, 1970      K. R. WOLFE      3,505,748
LAYOUT INDICATOR
Filed July 3, 1967      2 Sheets-Sheet 1
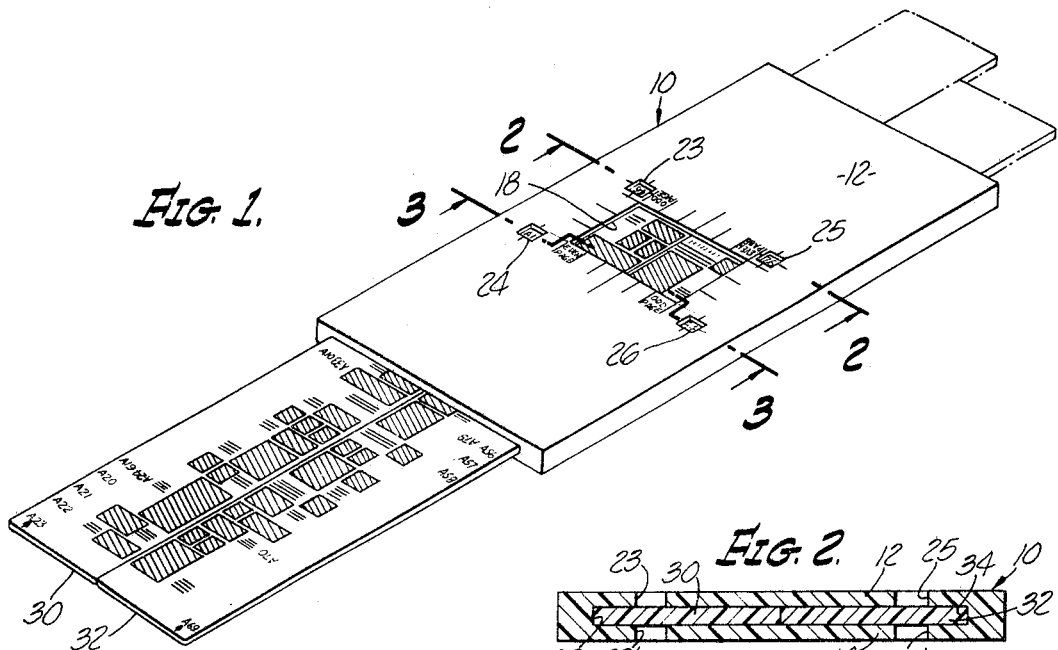
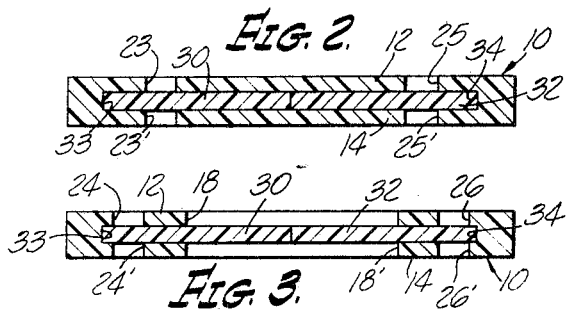
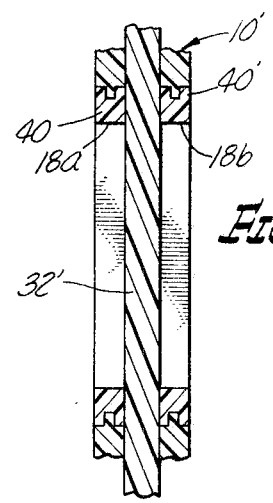
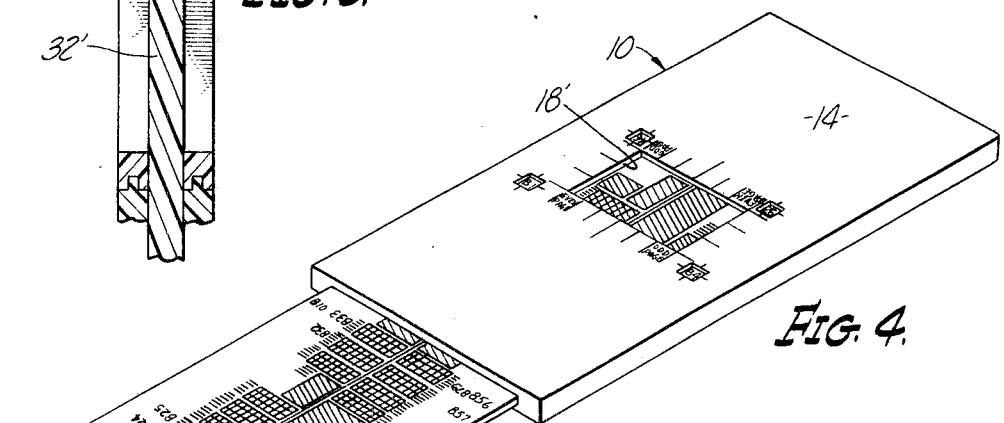
KENDALL R. WOLFE
INVENTOR.
BY
Herzig Walsh Blackham
ATTORNEYS April 14, 1970     K. R. WOLFE     3,505,748
LAYOUT INDICATOR Filed July 3, 1967     2 Sheets-Sheet 2

KENDALL R. WOLFE
INVENTOR

BY
Herzig, Walsh & Blackham
ATTORNEYS

United States Patent Office 3,505,748
Patented Apr. 14, 1970

3,505,748
LAYOUT INDICATOR
Kendall R. Wolfe, 490 S. San Vicente Blvd.,
Los Angeles, Calif. 90048
Filed July 3, 1967, Ser. No. 650,911
Int. Cl. G09b 1/16, 25/00
U.S. Cl. 35—53      1 Claim

ABSTRACT OF THE DISCLOSURE

The invention relates to the field of layouts of pictorial material and copy for printed publications such as school yearbooks for example. One each of two facing pages having an even and an odd page number of books, material comprising pictures and printed copy is presented in predetermined layout form, that is, in predetermined arrangements or patterns of the pictures and printed copy material, depending upon the size, shape and number of the pictures and copy and the effect desired. The device of the invention is a layout indicator for graphically illustrating a large number of such layouts or patterns and identifying individual layouts by code numbers, the device providing means for selecting and identifying by code number individual layouts which are presented in a viewing window in the device. In a preferred form of the invention, the layouts are graphically presented on strips that slide through a masking sleeve having a viewing window in it of a size to view an area representing facing even and odd pages of the book. The layouts are graphically displayed on the strips so that when the strip is moved a fraction of the depth of the viewing window, say ⅓ of this dimension, at each of these steps a discrete graphic layout is presented, and is identified by a code number presented in another window in the device. On the other side of the strips are presented layouts which are graphically such that a coded layout is presented and identified by its code number when the strips are moved in increments equal to the depth of the viewing window.

In a modified form of the invention the number of discrete identifiable layouts that can be selected by code is multiplied by increasing the width of the graphic presentation of the layouts and then providing an additional sliding member having a window that moves horizontally with respect to the first viewing window.

SUMMARY OF THE INVENTION

The invention relates to the field of layout of material to be printed on pages of a publication such as a yearbook for example. On each two facing pages of the book, the pages having an even and an odd number, material is presented in the form of pictures of various shapes and sizes and printed copy associated therewith. The problem involved is that of presenting this material to the publisher and printer such that the material will be organized, presented and printed in the book as desired. That is, the problem is that of layout of pictorial material and copy on each page. The material might be presented to the printer by way of making up a dummy book with the material pasted onto the pages according to an overall organization and layout or pattern as to individual pages. This approach is quite a formidable task. The primary object of this invention is to provide an indicating and coding instrument whereby in a simple way, the desired layout of each page of a book can be graphically portrayed and identified for the benefit of the printer. The material submitted need then only be identified by a code number which identifies the layout in which is to be arranged on the particular page in the book being printed. The nature of the graphic indicating instrument is such that merely by adjusting it to a code number particular individual layouts are graphically portrayed indicating how the material for a particular page is to be laid out.

In a preferred form of the invention it takes the form of a flat masking sleeve made of suitable material having viewing windows in its opposite sides. Flat strips of material are provided which slide through the sleeve and are visible through the viewing windows. On these strips are graphically represented or portrayed layouts representative of arrangements of pictorial material and copy on the odd and even pages of a book viewed through the window of the instrument. On one side of the strips the graphic layouts are so arranged that at each increment of sliding movement of the strip, which may be, for example, one-third of the width or depth of the viewing window, a discrete individual layout is presented in the viewing window and is identified by a particular code number appearing in a code window in the sleeve. Preferably, on the other side of the sliding strips layouts are similarly graphically represented which are identified by distinct identifying code characters as will be described.

From the foregoing brief elucidation of the invention, its further objects will be understood and appreciated. An object further to the principal object stated above, is to simplify the matter of presenting material to a publisher for printing and publishing in a desired organization or layout. A further object is to provide simplified and easily operable means whereby many different discrete individual layouts may be graphically represented for ease and simplicity of viewing and identification. A further corollary object is to provide simplified means for identifying by a code number or character, individual layouts that are graphically presented for viewing.

Further objects and additional advantages of the invention will become apparent from the following detailed description and annexed drawings wherein:

FIGURE 1 is a perspective view of a preferred form of the invention;

FIGURE 2 is a sectional view taken along line 2—2 of FIGURE 1;

FIGURE 3 is a sectional view taken along line 3—3 of FIGURE 1;

FIGURE 4 is a perspective view similar to that of FIGURE 1 of the opposite side of the instrument;

FIGURE 8 is a sectional view taken along line 8—8 of FIGURE 7.

Figures 5, 6:
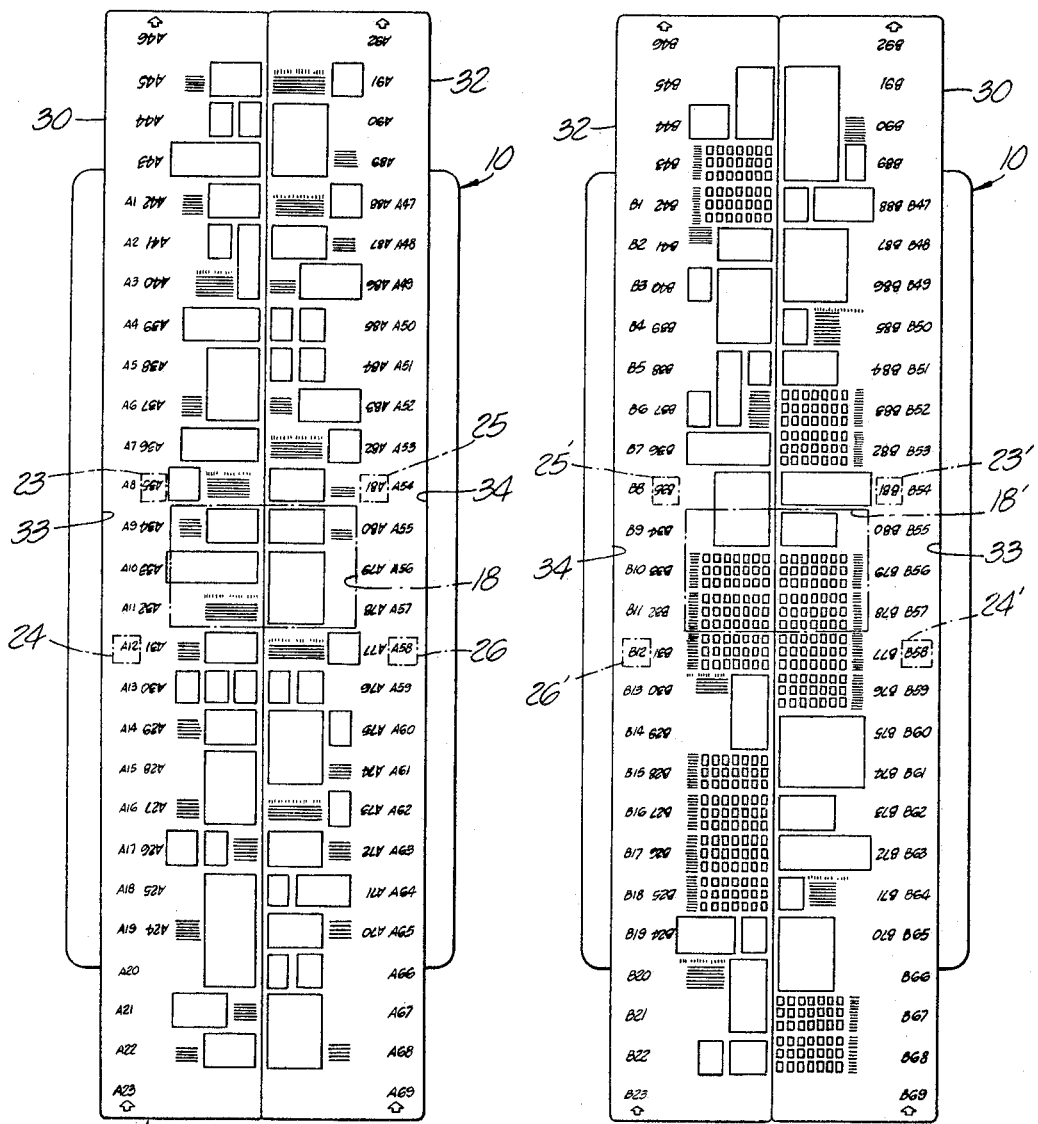
FIGURES 5 and 6 are views illustrating usage of the instrument.

Referring now to the figures the device comprises a sleeve 10 made of relatively thin material such as cardboard or plastic or the like, the sleeve being relatively flat and generally rectangular in form. The sleeve has a front 12 and a back 14 and is open at the ends. Provided in the side 12 is a rectangular window 18 in which may be view a graphic representation of the layout of pictorial material and copy on any of two facing pages of a book, the even page being identified on the left by a legend and the odd page being identified on the right by a similar legend. The legends are printed so that they may be read which ever end of the device is held as the top or bottom. Indexes adjacent to the window identify one-third incremental positions of the sliding members.

Adjacent to corners of the window 18 are square apertures forming windows as identified at 23, 24, 25 and 26. The purpose of these windows as will be described, is to identify code numbers related to the graphic representations that appear in the viewing window 18, on each of two slide members. Windows are similarly provided on the opposite side of sleeve 10 identified by primed reference numerals.

The numerals 30 and 32 designate strips of flat material which may be made of cardboard or plastic or the like which can be slid through the sleeve 10 in a position adjacent to each other as shown in the figures. The sides of the slot or opening through sleeve 10 are provided with grooves 33 and 34 and the strips 30 and 32 slide in these grooves. However, a laminated construction may be employed comprising top and bottom laminations and edge spacer laminations. These strips are shown entirely exposed in FIGURES 5 and 6. Printed on these strips are graphic outlined areas as shown in the figures. These areas are graphic representations of layouts of pictorial material and printed copy; such material is generally in the form of rectangular pictures and rectangular pieces of typed copy. Along one edge of the strip 30 are delineated graduations marked or identified by the numbers in a series A1, A2, A3, A4, etc. The graduations are spaced so that three graduations represent the depth or longitudinal dimensions of the viewing window. The graphic layouts portrayed on the strips are correlated with the coded graduations and the viewing window 18. The graphic areas are so graphically arranged however, that each time the strip 30 and 32 is moved one graduation, that is, one-third of the vertical dimension of the viewing window 18, a separate discrete individual coded layout is presented or exposed for view and it is identified to the viewer by the particular code numbers on the graduations which appear in the window 24. The graduated scale on the strip continues along an inwardly line in inverted order, and these graduations are viewable in another window 23. That is, each layout when viewed upside down, is a different layout identified by a separate character.

The strip 32 is like the strip 30 except that the layouts are different and the characters identifying the graduations continue sequentially in two columns spaced to be readable in windows 25 and 26. It will be observed that for each position of each strip identified by one of the graduations, a separate distinct coded graphic layout is portrayed for view, one strip being for even pages and one for odd. The position identified by each graduation of each strip can of course be set opposite each and every one of the positions identified by the graduations of the other strip, and then the total number of different layouts, having respect to the even and odd pages seen through the viewing windows, being increased in number accordingly. As explained each individual layout graphically presented is identified by its code number appearing in one or another of the code number viewing windows, this being true for the inverted or up side down positions as well.

The other side of the strips 30 and 32 is shown in FIGURES 4 and 6. There is provided a rectangular window 18' on the side 14 of the sleeve 10, similar legends as to the even and odd pages and similar indicia lines identifying the one-third incremental positions of the two pages viewed. Also there are provided apertures providing code number viewing windows 23', 24', 25' and 26'.

On this side of the strips the layouts graphically represented or portrayed are of a different design or pattern. On this side of the strips they are provided with graduations in a continuing series as one the other sides the characters being in the series B1, B2, B3, etc., and being similarly viewable in windows 23', 24', 25' and 26'.

From the foregoing, those skilled in the art will readily understand and appreciate the technique of using the graphic indicating instrument. Considering any proposed two pages of the book to be printed including an even and an odd numbered page, the material for these pages is appraised and the desired manner of laying it out and having it appear is arrived at. The user simply adjusts the strips 30 and 32 until the desired or preferred layout graphically appears in the window 18 (or 18') representing an appropriate layout for the pictorial and copy materials at hand. They are then simply marked for identification by the code numbers appearing in the code viewing windows. The user may of course graphically select the layout in this manner using one, either or both sides of the strips 30 and 32, the process being continued until all the material is identified by code numbers from the indicator as well as page numbers. The printer then upon receiving the material simply has recourse to another one of the graphic layout indicators or simply a code chart so that by simply referring to the code numbers provided on the material he can immediately present or select for viewing the graphic layout corresponding to that code number.

Various modifications and alternatives may be adopted with respect to the invention as described. While the instrument as shown is set up up for vertical or up and down movement of the strips with the graduations and code numbers arranged accordingly, obviously it can be arranged to be used with the strips moving horizontally with respect to the viewing window in the sleeve. Furthermore, a reversal of parts might be easily effected simply by having the graphic representations of layouts portrayed on a member that does not move, rather than one that does move. In other words rather than moving the strips, the viewing window might be arranged in a sliding panel which moves with respect to the layouts graphically portrayed on a backing.

Figure 7:
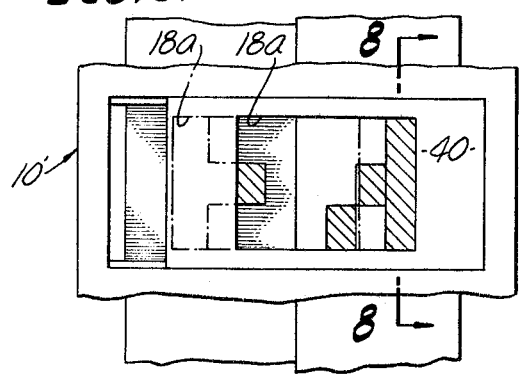
FIGURE 7 is a view of a modified form of the device.

FIGURES 7 and 8 show a modified form of the invention whereby the number of layouts that can be portrayed is multiplied by combining vertical and horizontal movements, (i.e.) movements normal to each other. Parts that are like the previous embodiment are similiarly numbered. In this embodiment window 18a is formed in sliding panel 40 that can slide horizontally (transversely to strips 30 and 32) having dove-tailed engagement with edges of window 18a. A similar panel 40' is provided on the other side. Strips 30' and 32' are made wider with the graphic layouts designed or arranged that discrete layouts are portrayed as the panel 40 is shifted horizontally in increments. Graduations may be provided if desired on panel 40 cooperating with a further series of code identifications on sleeve 10. This form of the invention is otherwise similar to the previous embodiment.

The foregoing disclosure is representative of preferred forms of the invention and is to be interpreted in an illustrative rather than a limiting sense, the invention to be accorded the full scope of the claim appended hereto.

I claim:
1. A graphic layout indicator comprising in combination an element of sheet material having graphically portrayed thereon representations of layouts of material to be printed, a second element of sheet material having a window in it through which said graphic representations can be viewed, means whereby said elements are relatively movable whereby certain of said graphic representations are masked and at least one is exposed for view in said window, graduations marked off along said first element in the direction of relative movement of the elements, and a code character identifying each graduation, said second element having means to expose for view one of said code characters at each relative position of the said elements identified by said graduations, said graphic representations being so configurated that at each relative position of the elements identified by one of said graduations and its identifying code character a discrete predetermined graphic layout is presented for view in said viewing window, said graphic layout representing a predetermined arrangement of pictorial and copy material to be printed for publication, said first element having spaced columns of graduations, with the characters on one inverted relative to the other, and a separate viewing window for each column to separately identify layouts viewed upside down.

References Cited
UNITED STATES PATENTS

| | | | |
|---|---|---|---|
| 1,162,828 | 12/1915 | Ammerstol | 235—89 |
| 1,202,586 | 10/1916 | Rindskopf | 35—53 |
| 1,360,726 | 11/1920 | Crook | 40—65 |
| 1,430,212 | 9/1922 | Brabant | 40—109 |
| 1,611,538 | 12/1926 | Landman | 40—109 |
| 1,958,192 | 5/1934 | Fletcher | 35—28.3 X |
| 2,485,892 | 10/1949 | Kirschbaum | 235—89 |
| 2,636,286 | 4/1953 | Bowman | 35—28.3 |
| 2,768,459 | 10/1956 | Corbett | 40—109 |

HARLAND S. SKOGQUIST, Assistant Examiner

U.S. Cl. X.R.

35—75